(12) United States Patent  
Szatkowski

(10) Patent No.: US 8,720,830 B1  
(45) Date of Patent: May 13, 2014

(54) EFFICIENT SOLAR PANEL WING-STOWAGE ON A SPACE LAUNCH VEHICLE

(75) Inventor: Gerard P. Szatkowski, Morrison, CO (US)

(73) Assignee: United Launch Alliance, L.L.C., Englewood, CO (US)

( * ) Notice: Subject to any disclaimer, the term of this patent is extended or adjusted under 35 U.S.C. 154(b) by 62 days.

(21) Appl. No.: 13/360,919

(22) Filed: Jan. 30, 2012

(51) Int. Cl.  
*B64G 1/44* (2006.01)

(52) U.S. Cl.  
USPC .................. 244/172.7; 244/173.1; 244/172.6

(58) Field of Classification Search  
USPC .......... 244/172.6, 172.7, 158.1, 173.1, 173.3; 136/244  
See application file for complete search history.

(56) References Cited

U.S. PATENT DOCUMENTS

| | | | |
|---|---|---|---|
| 3,627,585 A | 12/1971 | Dollery et al. | |
| 4,015,653 A | 4/1977 | Slysh et al. | |
| 5,052,640 A | 10/1991 | Chang | |
| 5,522,569 A | 6/1996 | Steffy et al. | |
| 5,641,135 A | 6/1997 | Stuart et al. | |
| 6,010,096 A | 1/2000 | Baghdasarian | |
| 6,318,674 B1 | 11/2001 | Simburger | |
| 7,714,797 B2 | 5/2010 | Couchman et al. | |
| 7,780,119 B2 * | 8/2010 | Johnson et al. | 244/173.1 |
| 2003/0015625 A1 | 1/2003 | McGee et al. | |
| 2007/0262204 A1 | 11/2007 | Beidleman et al. | |

OTHER PUBLICATIONS

"ESPA: The EELV Secondary Payload Adapter—Brochure," Moog Inc., 2010, 2 pages. Retrieved from: www.moog.com/literature/Space_Defense/Vibration_Control/MoogCSA_ESPA0710.pdf.

"U.S. Rocket Featuring New Swiss Structure Carries Telecommunications Satellite into Space," RUAG Space, Nov. 23, 2009, [retrieved on Nov. 9, 2011], 1 page. Retrieved from: www.ruar.com/space/Media/Media_Releases/Mediadetail?id=143.

Maly, et al., "Adapter Ring for Small Satellites on Responsive Launch Vehicles," AIAA 7th Responsive Space Conference, 2009, 10 pages.

* cited by examiner

*Primary Examiner* — Philip J Bonzell  
(74) *Attorney, Agent, or Firm* — Sheridan Ross P.C.

(57) ABSTRACT

An adapter assembly for interconnection with a launch vehicle is provided. Generally, the adapter assembly is positioned between two separable components of a launch vehicle along a longitudinal axis of the launch vehicle to structurally interconnect the components. In an embodiment, a solar panel having a stowed state and a deployed state is interconnected to the adapter assembly. In a stowed state, the solar panel can be positioned within the interior space of the adapter assembly to utilize space within the launch vehicle that would otherwise not be fully utilized.

18 Claims, 9 Drawing Sheets

EFFICIENT SOLAR PANEL WING-STOWAGE ON A SPACE LAUNCH VEHICLE

FIELD

The present disclosure is generally related to space launch vehicles, and more particularly, to efficient solar panel wing-stowage on a space launch vehicle.

BACKGROUND

Generally, launch vehicles comprise a booster stage, an upper stage, and a primary payload. The booster stage provides the initial boost towards orbit, and the upper stage is often employed to carry the primary payload to a further desired orbit or to achieve escape velocity. An example of a booster stage and upper stage combination is the Atlas V launch vehicle and the Centaur upper stage manufactured by either the United Launch Alliance (ULA), the assignee of the instant application, or the Lockheed Martin Corporation. Other launch vehicles also employ upper stages, such as the Delta II and the Delta IV launch systems manufactured by either the ULA or the Boeing Corporation.

An interstage adapter commonly is utilized to structurally interconnect the booster stage and the upper stage, and a payload adapter commonly is utilized to structurally interconnect the upper stage and the primary payload. The various stages and adapters typically are aligned along a common longitudinal axis of the launch vehicle and are designed to withstand launch loads. An example of an interstage adapter is the ISA-400 Interstage Adapter manufactured by Ruag Space. Examples of payload adapters include a C-adapter and an Evolved Expendable Launch Vehicle (EELV) Secondary Payload Adapter (ESPA).

Typical launch vehicles have unused space, for example, the space between various stages. In an effort to exploit this unused space, payload adapters have been designed and positioned in the unused space to transport additional payloads, i.e., secondary payloads, to space. The secondary payloads share the launch costs with the primary payload and have little to no impact on the primary payload's mission. In this way, the launch costs may be distributed among the various payloads, thereby reducing the cost attributable to the primary payload as well as the secondary payloads.

Providing sufficient power to meet the requirements of the secondary and/or tertiary payload mission(s) is an existing problem in the art. Generally, the secondary and/or tertiary payloads are powered by batteries and/or solar panels. As can be appreciated, batteries have a limited life whereas regenerative power sources, such as solar power, are readily available. The use and effectiveness of solar panels has been limited, however, because of the large size and volume required by the solar panels to provide the spacecraft adequate power for the mission. Typically, solar panels have been stowed external to the adapters and deployed transverse to the adapters in a standard wing fashion. However, for payload adapters disposed and transported within a payload fairing, the volume available for externally mounted solar panels is limited to the space between the payload adapter and the fairing internal envelope, which can be further limited by the presence of secondary payloads also mounted external to the payload adapter. Further, solar panels cannot be mounted externally to a payload fairing or to interstage adapters due to exposure to the harsh launch environment. None of the launch systems currently in existence or otherwise known to those of skill in the art address the aforementioned problems.

SUMMARY

It is an aspect of the present disclosure to stow a solar panel in an unused space within a launch vehicle adapter assembly. Unused space in a launch vehicle may result in unrealized revenue for the launch vehicle contractor. Thus, embodiments of the present disclosure offer increased revenue for the launch vehicle contractor while meeting the power requirements of secondary and/or tertiary payloads. In one embodiment, an adapter assembly comprises an adapter and/or a separation connector. The adapter can be, but is not limited to, a payload adapter, an interstage adapter, or other adapters known in the art which are positioned between separable components of a launch vehicle. Depending upon the separation system utilized to separate the separable components of the launch vehicle, a separation connector may remain attached to the adapter after separation of the separable components. Separation systems include, but are not limited to, clamp band release systems, discrete point release systems, and other separation systems known in the art. Separable components of a launch vehicle include, but are not limited to, a primary payload, an upper stage, and a booster stage.

It is another aspect of the present disclosure to stow a solar panel in a plane substantially perpendicular to a longitudinal axis of the launch vehicle and within a space defined by an adapter assembly. In some embodiments, a centerline of the stowed solar panel is parallel to or coaxial with a longitudinal axis of the launch vehicle. In one embodiment, an adapter assembly serves as a bus structure for a secondary spacecraft. In this embodiment, a solar panel can be stowed above and/or below the secondary spacecraft within an interior space generally adjacent to and defined by the adapter assembly that would otherwise be empty. Thus, the solar panel can deploy axially relative to the adapter assembly. In some embodiments, a plurality of solar panels is hingedly interconnected using opposing hinges. In these embodiments, upon deployment, the solar panels unfold to form a linear wing that can rotate freely from a single point to track the sun.

It is yet another aspect of the present disclosure to maximize power generation. In one embodiment, a plurality of solar panels is interconnected to form a solar array. The planar size of the solar panels can be made as large as the lateral, cross-sectional dimension of the adapter assembly. For example, if the adapter assembly is cylindrical in shape, the planar size of the panels can be made as large as the diameter of the portion of the adapter assembly of which the solar panels are stowed. In one configuration, the solar panels are stowed in a stack, and the number of solar panels in the stack is limited only by the unused longitudinal or axial space in the adapter assembly, which can vary.

It is a further aspect of the present disclosure to provide axial and lateral support to a stowed solar array within an adapter assembly. In one embodiment, a flange is utilized to maintain an axial alignment of the stowed solar array. In another embodiment, a guide member is utilized to maintain a lateral alignment of the stowed solar array.

The embodiments discussed herein can be modified to be used in association with any launch vehicle system that utilizes adapters between separable components of a launch vehicle. Similarly, embodiments of the present disclosure may be adapted for use with any type of adapter, including, but not limited to, a C-adapter and an Evolved Expendable Launch Vehicle (EELV) Secondary Payload Adapter (ESPA). In addition, embodiments of the present disclosure may be adapted for use with any size and shape of adapter, and is not limited to cylindrical adapters.

The terms primary and secondary are not intended to connote importance or priority, but are used to distinguish one payload from another. The terms auxiliary payload and secondary payload are synonymous. As used herein, 'spacecraft' is a craft that travels in space. The definition includes satellites that orbit another body. Additionally, as used herein, 'forward' refers to the direction towards an uppermost portion of the frame of reference in a launch stack configuration. Similarly, as used herein, 'aft' refers to the direction towards a lowermost portion of the frame of reference in a launch stack configuration.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

It should be understood that the drawings are not necessarily to scale. In certain instances, details that are not necessary for an understanding of the disclosure or that render other details difficult to perceive may have been omitted. It should be understood, of course, that the claimed invention is not necessarily limited to the particular embodiments illustrated herein.

DETAILED DESCRIPTION

Figure 1:
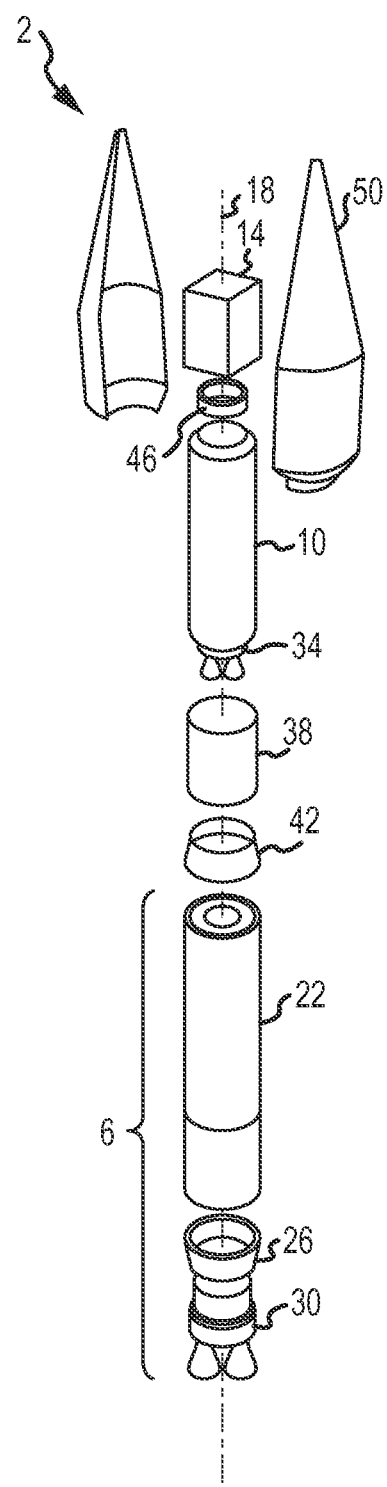
FIG. 1 is an expanded perspective view of a launch vehicle commonly employed to place a payload into a predetermined orbit.

With reference to FIG. 1, an embodiment of a launch vehicle 2 is shown. FIG. 1 generally depicts an Atlas V 400 series launch vehicle manufactured by ULA. The launch vehicle 2 comprises a booster stage 6, an upper stage 10, and a primary payload 14 aligned coaxially with a longitudinal axis 18 of the launch vehicle 2. The booster stage 6 includes a booster tank 22, a booster engine skirt 26, and a booster engine 30. The upper stage 10 includes an upper stage engine 34 and an upper stage engine skirt 38.

As depicted, adapters are positioned between separable components of the launch vehicle 2. For example, an interstage adapter 42 is positioned between the booster stage 6 and the upper stage 10 and aligned along the longitudinal axis 18 of the launch vehicle 2. The interstage adapter 42 structurally interconnects the booster stage 6 to the upper stage 10 and is configured to withstand launch loads. In addition, a payload adapter 46 is positioned between the upper stage 10 and the primary payload 14 and aligned along the longitudinal axis 18 of the launch vehicle 2. The payload adapter 46 structurally interconnects the upper stage 10 to the primary payload 14 and is configured to withstand launch loads. As can be appreciated, the number, size, and shape of adapters can vary depending on the launch vehicle 2 utilized, which typically is determined based on the primary payload 14 requirements. For example, only one interstage adapter 42 is depicted in FIG. 1, and, as depicted, the interstage adapter 42 is conical in shape. However, multiple interstage adapters 42 may be utilized with varying shapes and sizes. These adapters may be sequentially stacked in a coaxial orientation or positioned between different stages. In addition, FIG. 1 only depicts one cylindrical payload adapter 46. However, multiple payload adapters 46 may be utilized with varying shapes and sizes, typically in a stacked coaxial arrangement.

Although not depicted in FIG. 1, separation systems generally are associated with the adapters and are positioned between separable components to allow the components to separate from each other during and/or following launch. For example, once the booster tank 22 has fulfilled its requirement of achieving launch velocity or positioning the upper stage(s) at a desired location, a separation system separates the booster stage 6 from the upper stage 10. When sufficiently clear of atmosphere, the payload fairing 50 is jettisoned, the upper stage engine 34 is ignited, and the engine 34 propels the upper stage 10 and the interconnected primary payload 14 to orbit. Once in the desired orbit, a separation system separates the upper stage 10 from the primary payload 14.

Figure 2:
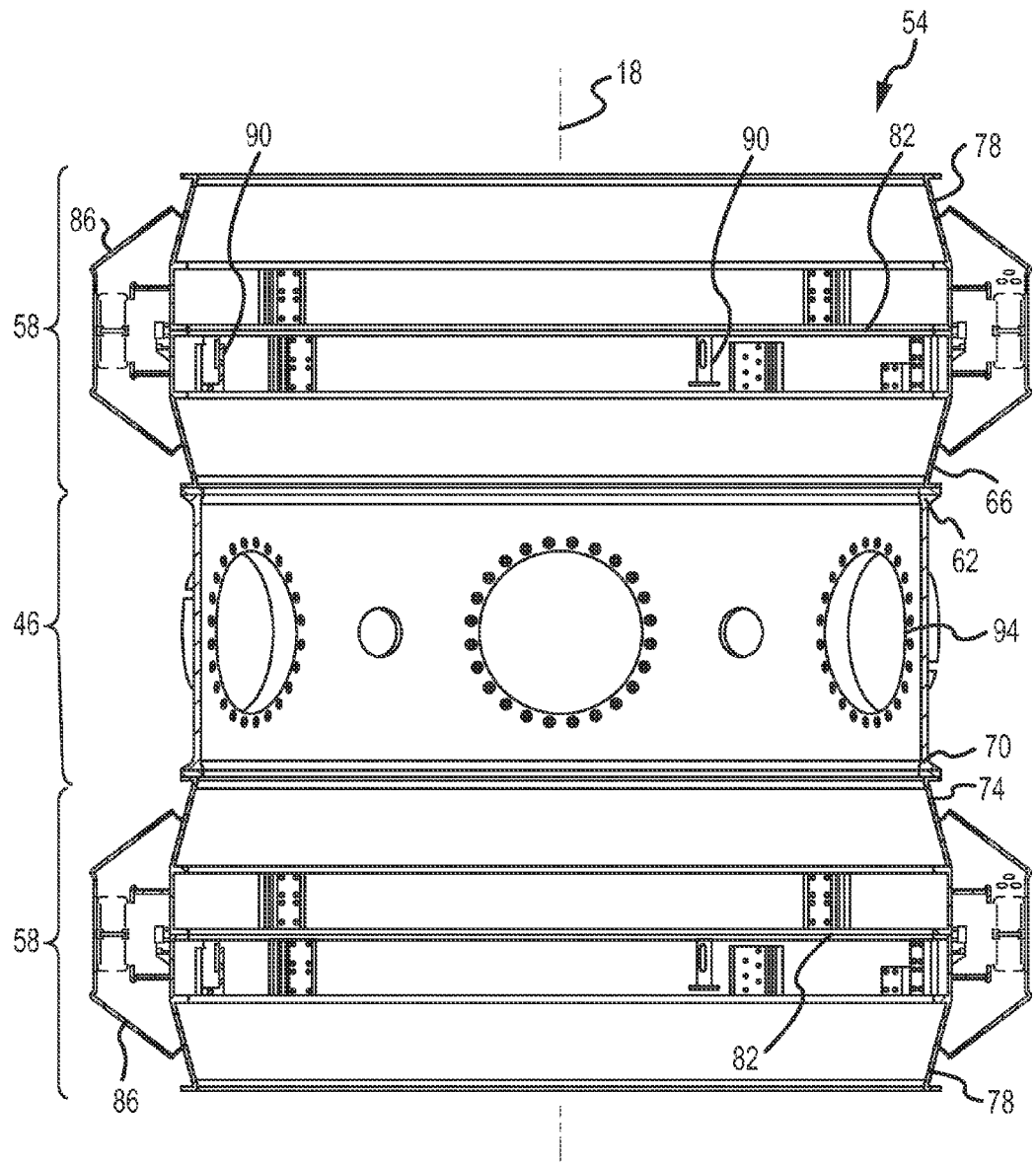
FIG. 2 is an elevation cross-sectional view of an adapter separation system.

Referring to FIG. 2, an adapter separation system 54 comprises an adapter 46 positioned between two separation systems 58. In the depicted embodiment, the adapter 46 comprises a payload adapter commonly referred to as an ESPA. The payload adapter 46 has a forward end 62 interconnected to a forward separation connector 66 and an aft end 70 interconnected to an aft separation connector 74. The forward and aft separation connectors 66, 74 are separably attached to detachable separation connectors 78 along a separation plane 82. As illustrated in FIG. 2, a clamp band release system 86, including an associated spring assembly 90, enables separation. Alternative release systems, as known in the art, may be utilized, including, but not limited to, discrete point release systems.

Figure 3:
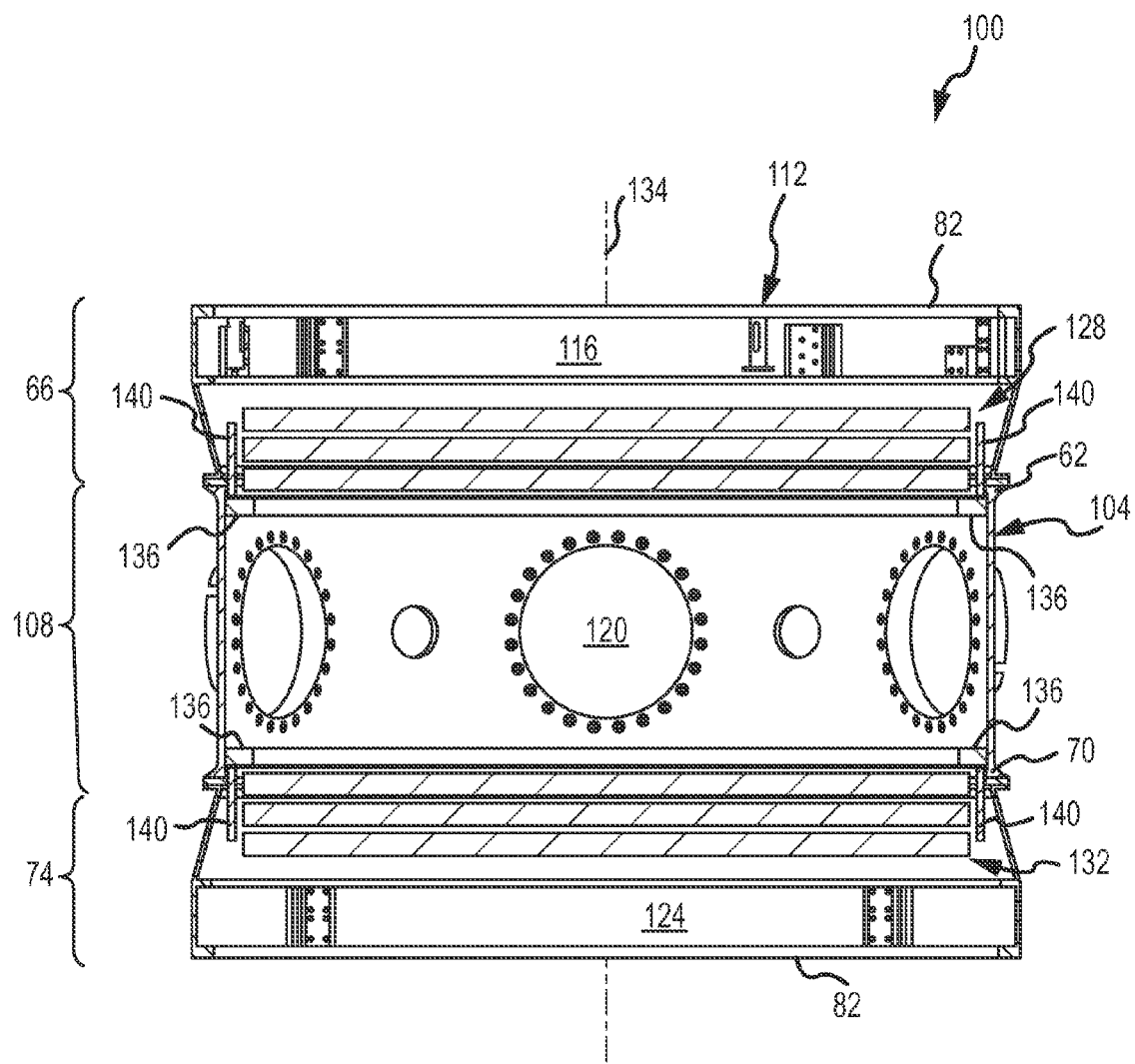
FIG. 3 is an elevation cross-sectional view of an embodiment of an adapter assembly having a plurality of solar panels stowed within an interior space.
Figure 3A:
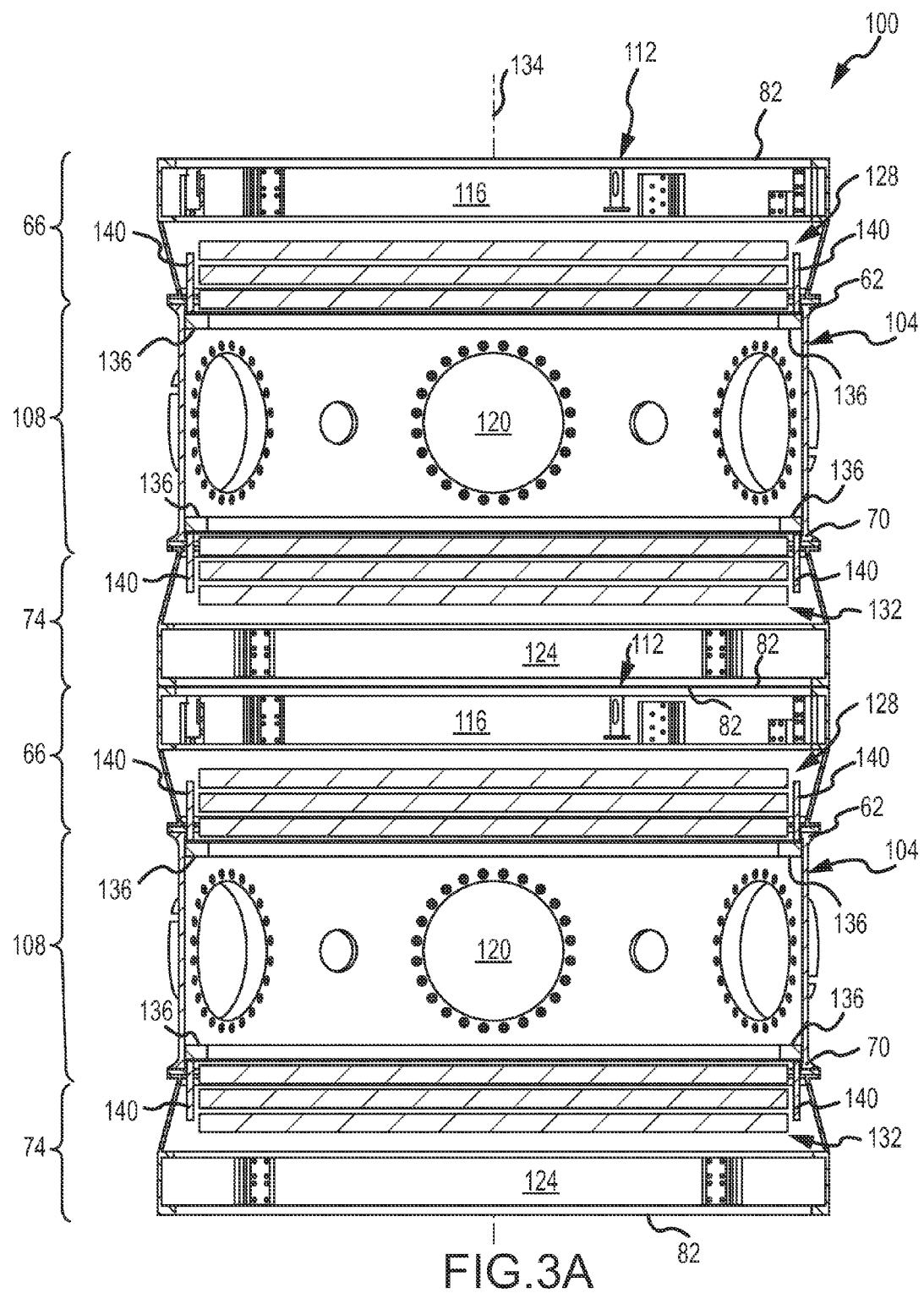
FIG. 3A is an elevation cross-sectional view of an embodiment of two stacked adapter assemblies each having a plurality of solar panels stowed within an interior space.

FIG. 3 depicts one embodiment of an adapter assembly 100 with a plurality of solar panels separated into two solar arrays 128, 132. The adapter assembly 100 includes a frame 104 comprising an adapter 108 interconnected on a forward end 62 to a forward separation connector 66 and interconnected on an aft end 70 to an aft separation connector 74. The frame 104 defines an interior space 112 comprising a forward separation connector interior space 116, an adapter interior space 120, and an aft separation connector interior space 124. The adapter 108 is depicted as an ESPA commonly utilized as a payload adapter 46 to mount additional payloads below the primary payload 14. However, alternative adapters may be utilized, including, but not limited to, C-adapters, other adapters known in the art, or any combination thereof. Further, the adapter assembly 100 may be utilized as an interstage adapter 42 and/or a payload adapter 46. As can be appreciated, the adapter assembly 100 is scalable to various sizes depending on the launch vehicle requirements, can be constructed in various shapes, and can be formed of various materials, including, but not limited to, aluminum and/or carbon fiber composite. The frame 104 is depicted in FIG. 3 as including an adapter 108, a forward separation connector 66, and an aft separation connector 74. However, the frame 104 may include an adapter 108 by itself or an adapter 108 with any combination of forward and/or aft separation connectors 66, 74. Additionally, multiple adapter assemblies 100 may be stacked, as shown in FIG. 3A, to provide additional interior space for a secondary payload or to serve as hubs for separate spacecraft.

Still referring to FIG. 3, at least one array of solar panels is stowed within the frame interior space 112. A first array of solar panels 128 is interconnected to a forward end 62 of the adapter 108, and a second array of solar panels 132 is interconnected to an aft end 70 of the adapter 108. In the depicted embodiment, the first array of solar panels 128 is stowed within the interior space 120 of the adapter 108 and the interior space 116 of the forward separation connector 66. The second array of solar panels 132 is stowed within the interior space 120 of the adapter 108 and the interior space 124 of the aft separation connector 66. As can be appreciated, the arrays of solar panels 128, 132 alternatively can be positioned entirely within the space defined by the separation connectors 66, 74 or the adapter 108. In addition, two arrays of solar panels are not required. Rather, a single array of solar panels can be provided. The number of solar panels in an array will depend on the power requirements of a secondary payload associated with the frame 104 and the interior space 112 available within the frame 104. In the depicted embodiment, the solar panels are stowed within the interior space 112 of the frame 104 in a plane substantially perpendicular to a longitudinal axis 134 of the frame 104, which, in one embodiment, is coaxial with the longitudinal axis 18 of the launch vehicle 2. This stowed configuration allows the solar array to deploy in an axial direction relative to the frame 104 and minimize the likelihood of an interference with the frame 104 during deployment.

The adapter assembly 100 embodiment depicted in FIG. 3 also includes an optional annular flange 136 interconnected to the frame 104 that supports and/or maintains the two arrays of solar panels 128, 132 in longitudinal alignment during launch and prior to deployment. As depicted, a forward flange 136 provides additional support to the first array of solar panels 128 to counteract axial loads encountered during launch and prevents the first array of solar panels 128 from displacing aft of the forward flange 136. An aft flange 136 prevents the second array of solar panels 128 from displacing forward of the aft flange 136. A guide member 140 associated with the flange 136 also is provided in FIG. 3 to maintain the solar panels in lateral alignment during launch. In addition, the guide member 140 guides the two arrays of solar panels 128, 132 during deployment to prevent the arrays from contacting an inner wall of the frame 104. The flange 136 and the guide member 140 may extend continuously around the inner periphery of the frame 104 or, alternatively, be provided in discrete locations around the inner periphery of the frame 104. In the depicted embodiment, the first array of solar panels 128 and the second array of solar panels 132 are positioned partially within the interior space 120 of the adapter 108, and the flange 136 is interconnected to the adapter 108. In an alternate embodiment, a solar array is positioned entirely within the interior space 120 of the adapter 108. In another alternate embodiment, a solar array is positioned entirely within the interior space of a separation connector between the separation plane 144 and an end of the adapter 108. In the latter embodiment, a flange 136, if provided, can be interconnected to the separation connector rather than the adapter 108.

Figure 4:
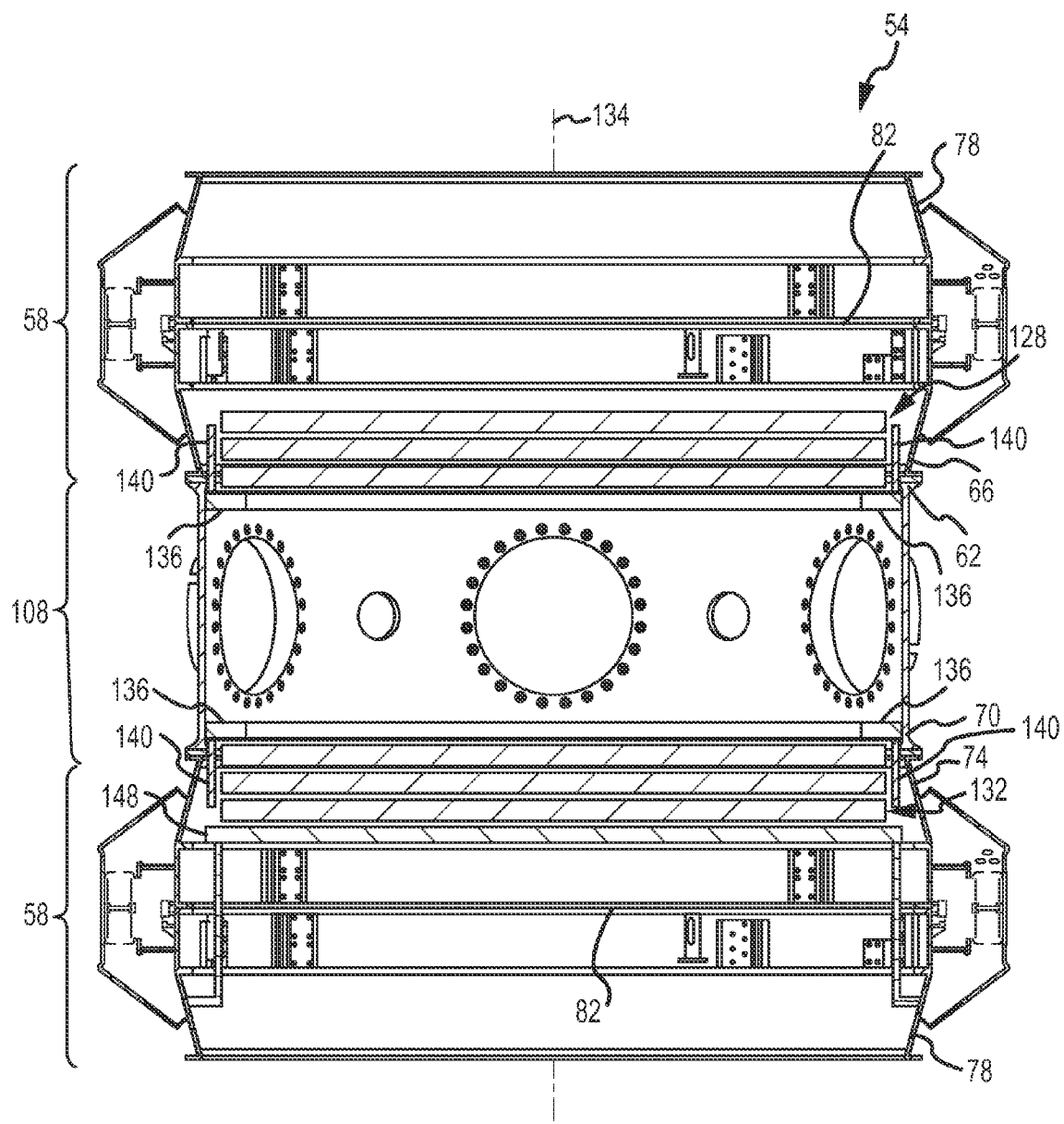
FIG. 4 is an elevation cross-sectional view of an embodiment of an adapter separation system having a plurality of solar panels stowed within an interior space.

Referring now to FIG. 4, an embodiment of an adapter separation system 54 with a plurality of solar panels separated into two solar arrays 128, 132 is provided. The adapter separation system 54 depicted in FIG. 4 includes an aft support structure 148 that maintains the second array of solar panels 132 in longitudinal alignment during launch, supports the second array of solar panels 132 to counteract axial loads encountered during launch, and prevents the second array of solar panels 132 from displacing aft of the aft support structure 148. As depicted, the aft support structure 148 interconnects to a detachable separation connector 78, which separates from the frame 104 during separation of the adapter assembly 100 from the separable launch vehicle component associated with the detachable separation connector 78.

Figure 5:
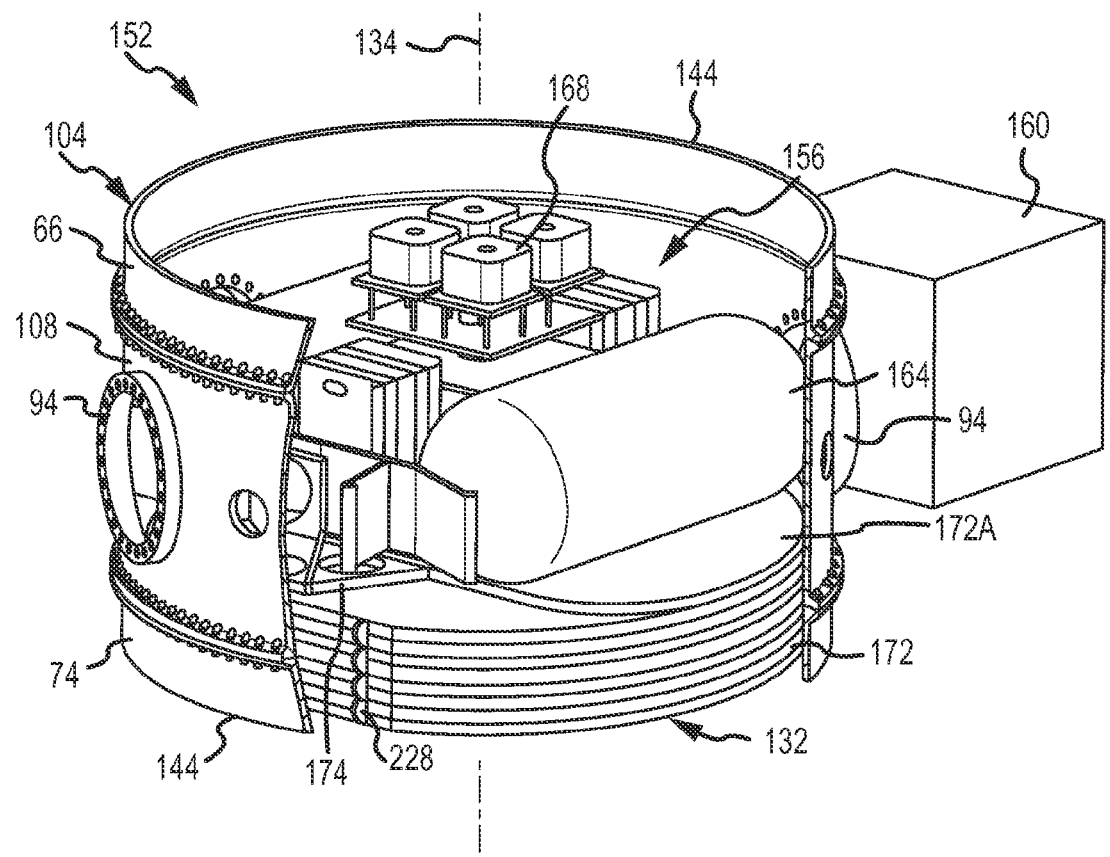
FIG. 5 is a partially fragmented perspective view of an embodiment of an adapter assembly serving as a bus structure for a secondary payload with a plurality of solar panels stowed within an interior space.

Referring to FIG. 5, an embodiment of an adapter stage 152 is provided. The adapter stage 152 includes a spacecraft 156 which utilizes a frame 104 as the spacecraft 156 bus structure. The frame 104 comprises an adapter 108 positioned between, and interconnected to, a forward separation connector 66 and an aft separation connector 74. In the illustrated embodiment, the adapter 108 is an ESPA having radial ports 94 to secure as many as six modules 160 around its outer perimeter. The spacecraft 156 components are generally positioned within the interior volume of the frame 104 and may include a propellant tank 164, a propulsion module 168, and an array of solar panels 132, as well as a number of other modules such as an avionic module, a data module, a control module, and/or mission specific modules. Payload modules and/or secondary/tertiary payloads may be interconnected to the radial ports 94, and may separate from the adapter 108 at appropriate times or remain attached to the adapter 108 to benefit from the adapter's capabilities.

In the depicted embodiment, the array of solar panels 132 provides power to the secondary spacecraft 156 and includes a plurality of solar panels 172 stowed in a plane substantially perpendicular to the longitudinal axis 134 of the adapter 108. In some embodiments, a centerline of the stowed solar panels 172 is parallel to or coaxial with the longitudinal axis 134 of the adapter 108 and/or the longitudinal axis 18 of the launch vehicle 2. An innermost solar panel 172A includes a yoke 174 that extends the innermost solar panel 172A beyond the separation plane 144 during deployment to allow the solar panels 172 to rotate and track the sun during operation without interference with the frame 104. In the depicted embodiment, a single array 132 of solar panels is stowed aft of the spacecraft 156 within the interior space of the adapter 108 and the aft separation connector 74. Alternatively, instead of one array 132 of solar panels being positioned near one end of the adapter 108, two separate arrays of solar panels can be provided near each end of the adapter 108 that deploy longitudinally in opposite directions relative to the secondary spacecraft 156. In some embodiments, multiple arrays of solar panels may be stowed near one end of the adapter 108 and deployed longitudinally in the same direction relative to the secondary spacecraft 156.

Figure 6:
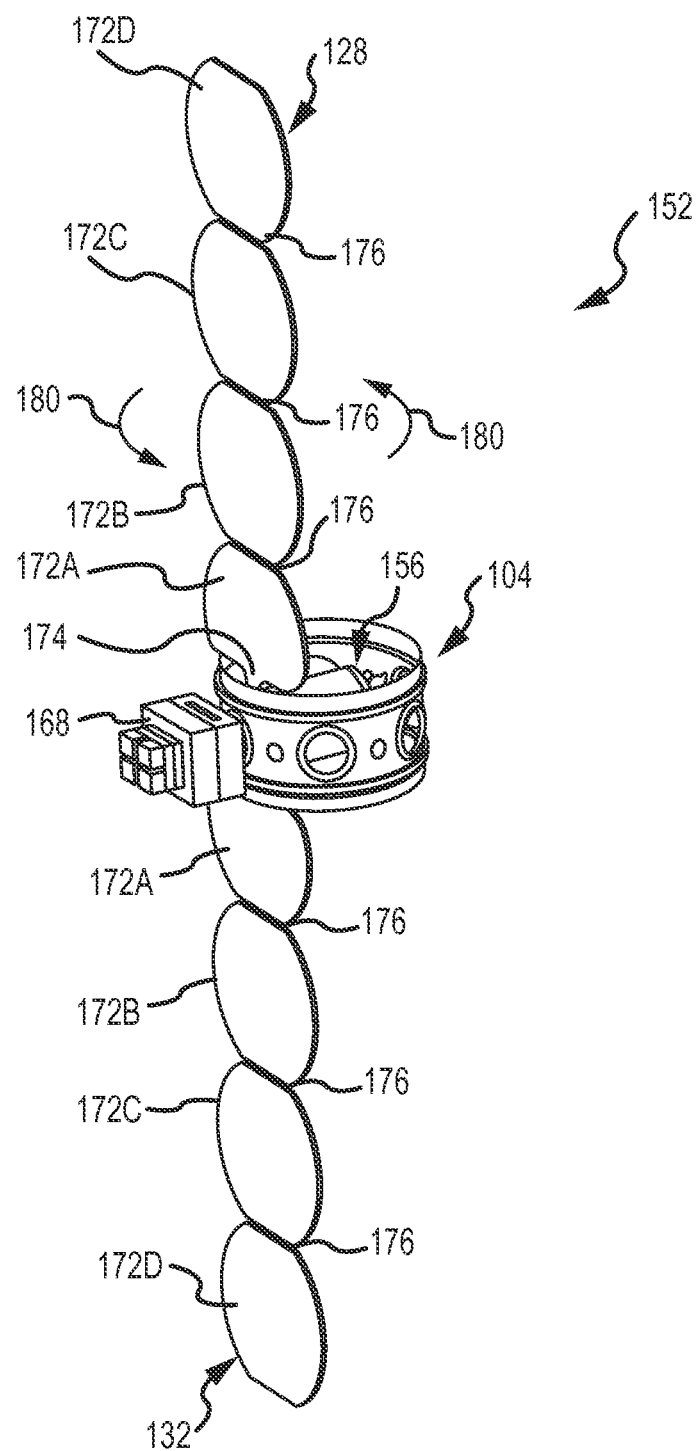
FIG. 6 is a perspective view of an embodiment of an adapter assembly serving as a bus structure for a secondary payload with a plurality of deployed solar panels.

As depicted in FIG. 6, a first array of solar panels 128 is positioned on one end of the frame 104 and a second array of solar panels 132 is positioned on an opposing end of the frame 104. As illustrated, both arrays 128, 132 are deployed and form linear wings extending longitudinally from the frame 104. A yoke 174 extends the innermost solar panel 172A beyond the frame 104 to allow rotation 180 of the solar panels 172. The rotation 180 allows the solar panels 172 to track the sun during operation. In FIG. 6, each array 128, 132 includes four solar panels 172A-D; however, as discussed above, the number of solar panels 172 may vary depending on the power requirements of the spacecraft 156. For example, the arrays 128, 132 may comprise a single solar panel 172A. As illustrated, hinges 176, as known in the art, interconnect the solar panels 172. Also, a propulsion module 168 is interconnected to a radial port 98 and provides thrust to propel the spacecraft 156 through space.

Figure 7:
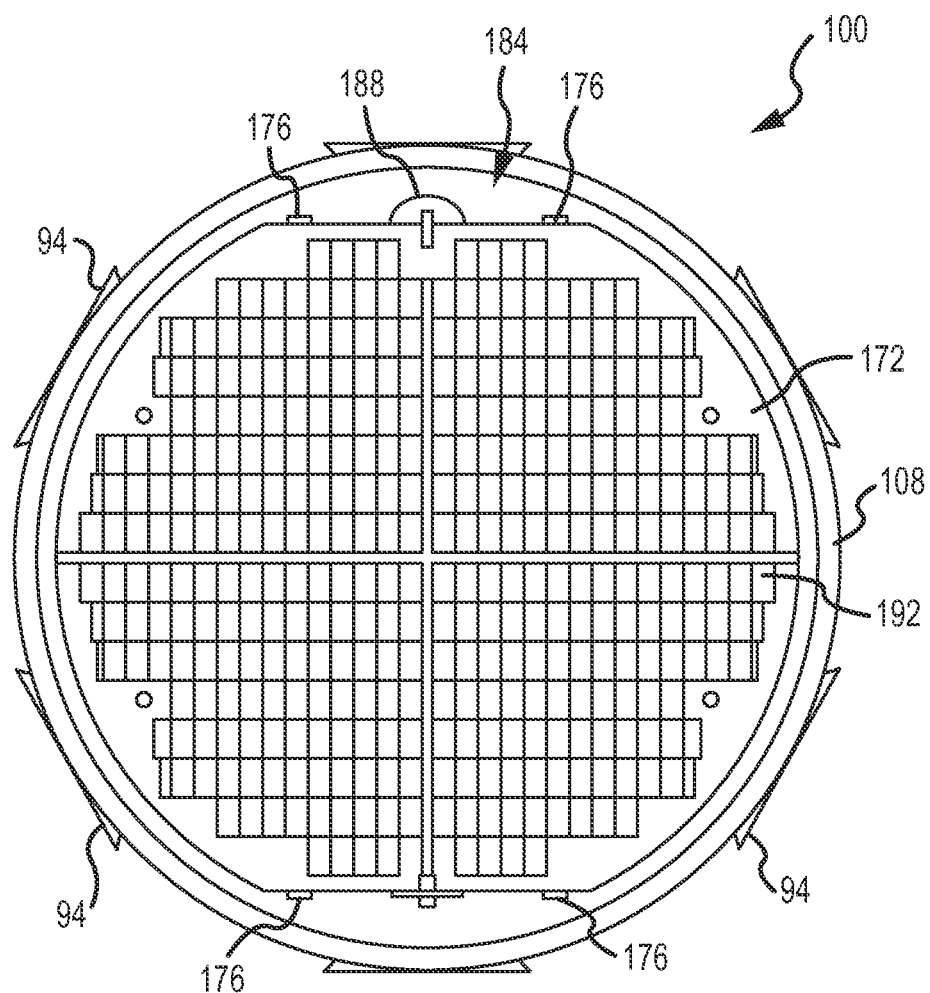
FIG. 7 is a top plan view of an embodiment of an adapter assembly and a stowed solar array assembly.

Referring to FIG. 7, a top view of an embodiment of an adapter assembly 100 and a stowed solar array assembly 184 is provided. As illustrated, the solar array assembly 184 includes a solar panel 172, hinges 176, and a solar array drive motor 188. The solar panel 172 has a plurality of solar cells 192 and is stowed within a cylindrical-shaped adapter 108. As depicted, the size of the solar panel 172 can be made as large as the diameter of the internal space of the adapter 108 or smaller as is appropriate for the mission objective. In the depicted embodiment, the solar panel 172 is mounted to the adapter 108 in line or coaxially with a longitudinal axis of the adapter 108, which may be coaxial with the longitudinal axis 18 of the launch vehicle 2 once assembled in a launch stack configuration.

Figure 8:
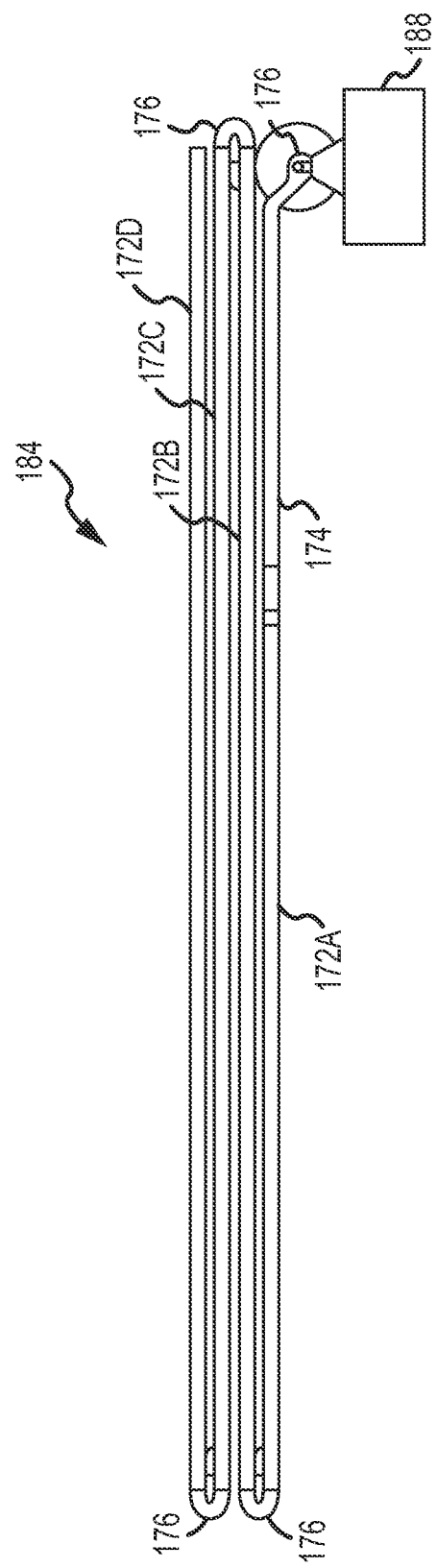
FIG. 8 is an elevation view of an embodiment of a stowed solar array assembly.

Referring to FIG. 8, an embodiment of a stowed solar array assembly 184 is depicted. The illustrated solar array assembly 184 is stowed in a stacked configuration and includes four solar panels 172A-D, opposing hinges 176 interconnecting the solar panels 172A-D, and a solar array drive motor 188. In the depicted embodiment, the panels 172 unfold from a stowed state to a deployed state using opposing hinges 176, commonly referred to as bi-folds, to form a linear wing that can then rotate freely from a single pivot point to track the sun. Also, a solar array drive motor 188 interconnects the yoke 174 to the frame 104 and rotates the deployed array of solar panels 45 to track the sun. In a stowed state, in one embodiment, a solar array drive motor 188 stabilizes the solar panels 172A-D during launch. As discussed earlier in connection with FIGS. 3-4, a flange 136 and/or support structure 148 may provide support to counteract loads encountered during launch. Further, other structures known in the art, for example a standoff structure, may be utilized to provide axial support during launch. To maintain the solar array in a stowed state, the solar array can utilize a release system known in the art, including, but not limited to, a frangibolt release system. Once released, the stowed array of solar panels deploys into a linear wing, and the deployment mechanism can be motorized. However, in one embodiment, preloaded hinges, which may include torsion springs, deploy the solar panels 172A-D from a stowed state to a deployed state. As depicted, an innermost solar panel 172A may include a yoke 174 that extends the innermost panel 172A beyond the frame 104 when in a deployed state. This allows the deployed array of solar panels to rotate freely without interference with the frame 104.

To assemble a launch vehicle 2 according to embodiments of the present disclosure, two separable components of a launch vehicle 2, along with a frame 104 and a solar panel 172, are obtained. The frame 104 may comprise an adapter 108 having a forward end 62 and an aft end 70. In addition, the frame 104 may further comprise a forward separation connector 66 and an aft separation connector 74. If included, the forward separation connector 66 is interconnected to the forward end 62 of the adapter 108 and the aft separation connector 74 is interconnected to the aft end 70 of the adapter 108. Following assembly of the frame 104, the solar panel 172 is interconnected to an inner surface of the frame 104, which may entail interconnecting a solar array drive motor 188 to the frame 104.

In an embodiment, the solar panel 172 is stowed within the interior space of the frame 104 in a plane substantially perpendicular to a longitudinal axis 134 of the frame 104. In one configuration, the solar panel 172 is stowed coaxially with the longitudinal axis 18 of the launch vehicle 2. The solar panel 172 may be stowed within an interior space defined by an adapter 108, a forward separation connector 66 if provided, an aft separation connector 74 if provided, or any combinations thereof. To maintain the solar panel 172 in an axial alignment relative to the frame 104 when in a stowed state, a flange 136 may be disposed on an interior surface of the frame 104. To maintain the solar panel 172 in a lateral alignment within the frame 104, a guide member 140 may be interconnected to the frame 104. As can be appreciated, a plurality of solar panels 172 can be interconnected together to form a solar array. In addition, a plurality of solar arrays may be provided and interconnected to the frame 104. After stowing the solar panel 172, the frame 104 is positioned between the components along the longitudinal axis 18 of the launch vehicle 2. After alignment, the frame 104 is structurally interconnected to the components to provide a load path to transfer loads encountered during launch through the launch vehicle 2.

While various embodiments have been described in detail, it is apparent that modifications and alterations of those embodiments will occur to those skilled in the art. However, it is to be expressly understood that such modifications and alterations are within the scope and spirit of the claimed invention, as set forth in the following claims.

What is claimed is:

1. A system for stowing one or more solar panels on a launch vehicle comprising:

a launch vehicle having a longitudinal axis, and a first component and a second component, where at least one of the first and second components are separable from the launch vehicle;

a frame positioned between the first and second components and structurally interconnecting the first and second components, the frame and the first and second components aligned along the longitudinal axis of the launch vehicle, the frame comprising a perimeter wall defining an interior space and having a longitudinal axis, and at least one port extending through the perimeter wall for the receipt of a payload module; and at least one solar panel having a stowed state and a deployed state, wherein in a stowed state the at least one solar panel is positioned within the interior space of the frame in a plane substantially perpendicular to the longitudinal axis of the frame.

2. The system of claim 1, wherein in a stowed state the at least one solar panel is aligned coaxially with the longitudinal axis of the launch vehicle.

3. The system of claim 1, wherein the first and second components comprise a primary payload and an upper stage.

4. The system of claim 1, wherein the first and second components comprise an upper stage and a booster stage.

5. The system of claim 1, wherein the frame comprises a guide member for maintaining the at least one solar panel in a lateral alignment within the frame.

6. The system of claim 1, further comprising a payload module connected to the port and positioned on the outside of the adapter.

7. The system of claim 1, wherein the frame comprises an adapter having a forward end and an aft end, a first separation ring interconnected to the forward end of the adapter, and a second separation ring interconnected to the aft end of the adapter.

8. The system of claim 7, wherein, in a stowed state, the at least one solar panel is at least partially positioned within an interior space defined by the adapter.

9. The system of claim 7, wherein the at least one solar panel comprises a first array and a second array of solar panels, and wherein the first array is positioned at least partially within an interior space defined by the first separation connector and the second array is positioned at least partially within an interior space defined by the second separation connector.

10. The system of claim 9, wherein the frame comprises a first flange for maintaining the first solar panel array in the substantially perpendicular plane when in a stowed state and a second flange for maintaining the second solar panel array in the substantially perpendicular plane when in a stowed state.

11. A launch vehicle having a longitudinal axis, the launch vehicle comprising:
- a payload;
- an upper stage; and
- an adapter assembly positioned between the payload and the upper stage and structurally interconnecting the payload and the upper stage, the adapter assembly comprising a frame having a longitudinal axis, a solar panel having a stowed state and a deployed state and a perimeter wall having a height extending parallel to the longitudinal axis and an interior surface and exterior surface, wherein the frame defines an interior space, and wherein in a stowed state the solar panel is positioned within the interior space of the frame in a plane substantially perpendicular to the longitudinal axis of the frame, and wherein the perimeter wall further comprises at least one port extending from the interior surface to the exterior surface and adapted to receive a payload module.

12. The launch vehicle of claim 11, wherein in a stowed state the solar panel is aligned coaxially with the longitudinal axis of the launch vehicle.

13. A method of assembling a launch vehicle having a longitudinal axis, the method comprising:
- obtaining a plurality of solar panels, a frame having a longitudinal axis, a forward end and an aft end and defining an interior space, a first separation ring, a second separation ring, and two separable components of the launch vehicle;
- interconnecting the first separation ring to the forward end of the frame and the second separation ring to the aft end of the frame;
- interconnecting a first and a second array of solar panels to the frame;
- stowing the first array of solar panels at least partially within the interior space of the frame defined by the first separation ring and in a plane substantially perpendicular to the longitudinal axis of the frame;
- stowing the second array of solar panels at least partially within the interior space of the frame defined by the second separation ring and in a plane substantially perpendicular to the longitudinal axis of the frame;
- positioning the frame between the separable components along the longitudinal axis of the launch vehicle; and
- interconnecting the frame to the separable components.

14. The method of claim 13, wherein the stowing step further comprises stowing the solar panel coaxially with the longitudinal axis of the launch vehicle.

15. The method of claim 13, wherein the frame comprises a payload adapter, and wherein the separable components comprise a primary payload and an upper stage.

16. The method of claim 13, further comprising interconnecting an annular flange to the frame to maintain the solar panel in the substantially perpendicular plane when in a stowed state.

17. The method of claim 13, further comprising interconnecting a guide member to the frame to maintain the solar panel in a lateral alignment within the frame.

18. A system for stowing one or more solar panels on a space vehicle comprising:
- a space vehicle having a longitudinal axis, and a first component and a second component, where at least one of the first and second components are separable from the space vehicle;
- a frame positioned between the first and second components and structurally interconnecting the first and second components, the frame and the first and second components aligned along the longitudinal axis of the space vehicle, the frame defining an interior space and having a longitudinal axis;
- the frame further comprising an adapter having a forward end and an aft end, a first separation ring interconnected to the forward end of the adapter, and a second separation ring interconnected to the aft end of the adapter; and
- a first array and a second array of solar panels having a stowed state and a deployed state, wherein in a stowed state the first array is positioned in a plane substantially perpendicular to the longitudinal axis of the frame and at least partially within an interior space defined by the first separation connector and the second array is positioned in a plane substantially perpendicular to the longitudinal axis of the frame and at least partially within an interior space defined by the second separation connector.

* * * * *